US011965501B2

(12) United States Patent
Ramsey et al.

(10) Patent No.: US 11,965,501 B2
(45) Date of Patent: Apr. 23, 2024

(54) SYSTEM AND METHOD FOR DETERMINING OPERATIONAL READINESS OF A BACKUP HYDRAULIC PUMP SYSTEM

(71) Applicant: Deere & Company, Moline, IL (US)

(72) Inventors: Michael S. Ramsey, Waterloo, IA (US); Michael A. Holland, Conrad, IA (US); Nathanael K. Rehn, Waterloo, IA (US); Jacob M. Kongs, Marysville, KS (US); Jordan Tagtow, Waterloo, IA (US)

(73) Assignee: Deere & Company, Moline, IL (US)

( * ) Notice: Subject to any disclaimer, the term of this patent is extended or adjusted under 35 U.S.C. 154(b) by 825 days.

(21) Appl. No.: 17/084,843

(22) Filed: Oct. 30, 2020

(65) Prior Publication Data

US 2022/0136498 A1 May 5, 2022

(51) Int. Cl.
*F04B 49/06* (2006.01)
*F04B 51/00* (2006.01)
(Continued)

(52) U.S. Cl.
CPC ............ *F04B 49/065* (2013.01); *F04B 51/00* (2013.01); *F15B 19/005* (2013.01); *F15B 20/004* (2013.01); *F04B 17/03* (2013.01); *F04B 49/02* (2013.01); *F15B 2211/8633* (2013.01); *F15B 2211/8757* (2013.01)

(58) Field of Classification Search
CPC ........ F04B 49/065; F04B 51/00; F04B 17/03; F04B 49/02; F15B 19/005; F15B 20/004; F15B 2211/8633; F15B 2211/8757
See application file for complete search history.

(56) References Cited

U.S. PATENT DOCUMENTS 4,317,499 A 3/1982 Miller
4,345,660 A 8/1982 Miller
(Continued)

FOREIGN PATENT DOCUMENTS

DE 102018219365 A1 5/2020

OTHER PUBLICATIONS

German Search Report issued in application No. DE102021210778.8, dated Feb. 2, 2023, 08 pages.

*Primary Examiner* — Connor J Tremarche
(74) *Attorney, Agent, or Firm* — Tucker Ellis LLP

(57) ABSTRACT

A system and technique for determining functionality of a hydraulic system including first and second motors mutually coupled in driving relation with a pump, a sensor generating a signal representative of a monitored condition, and a controller configured to selectively control activation and deactivation of the motors. Fitness detection logic stored in memory of the controller is executable by a processor to: determine, based on the signal while the first motor is activated and second motor is deactivated during a first test interval, whether the monitored condition meets a pre-defined threshold prior to expiration of the first test interval; determine, based on the signal while the second motor is activated and first motor is deactivated during a second test interval, whether the monitored condition meets the pre-defined threshold prior to expiration of the second test interval; and generate a readiness signal representative of the determined functionality of the hydraulic system.

20 Claims, 9 Drawing Sheets

(51) Int. Cl.

| | |
|---|---|
| ***F04D 15/00*** | (2006.01) |
| ***F04D 15/02*** | (2006.01) |
| ***F15B 19/00*** | (2006.01) |
| ***F15B 20/00*** | (2006.01) |
| *F04B 17/03* | (2006.01) |
| *F04B 49/02* | (2006.01) |

(56) References Cited

U.S. PATENT DOCUMENTS

| | | | | |
|---|---|---|---|---|
| 5,747,950 | A | 5/1998 | Friedrichsen | |
| 8,447,458 | B2 * | 5/2013 | Grochowski | B62D 5/30 701/41 |
| 9,528,520 | B2 * | 12/2016 | Cummings | F04D 13/14 |
| 9,902,251 | B2 | 2/2018 | Butts et al. | |
| 10,259,493 | B2 | 4/2019 | Mate et al. | |
| 2015/0198507 | A1 * | 7/2015 | Mork | B62D 5/30 701/34.4 |
| 2016/0332664 | A1 * | 11/2016 | Oldridge | B62D 5/065 |

* cited by examiner

SYSTEM AND METHOD FOR DETERMINING OPERATIONAL READINESS OF A BACKUP HYDRAULIC PUMP SYSTEM

FIELD OF INVENTION

The present disclosure relates to systems and methods for determining functionality of a hydraulic pump system driven by multiple motors, and more particularly, to systems and methods for testing the operational readiness of a backup hydraulic pump system driven by multiple mutually coupled motors.

BACKGROUND

Hydraulic pump systems are commonly used in vehicles, work machines, and the like to supply power to control systems, such as steering systems, braking systems, and the like. As a convenience and safety feature, some machines, in particular tractors, have been equipped with backup hydraulic systems that are redundant to the main hydraulic pump system. These typically include an auxiliary motor coupled with a backup pump. In the event the primary hydraulic system is unable to provide adequate power to the control systems of the tractor, the backup hydraulic system, in particular the backup pump, may be activated to supply power to the control systems. In this manner, backup hydraulic systems permit a user to maintain control of a work machine or vehicle in the event of a failure in a primary pump, such as due to leakage, main pump malfunction, or the like.

In a tractor, for example, the backup hydraulic system may be activated when the main hydraulic system is unable to provide sufficient power to support control of vehicle systems, such as the steering and braking systems. In this scenario, the backup hydraulic system can be activated to supply sufficient power to the control systems to permit the operator to maneuver the tractor to a safe position off the road or onto a trailer to transport the tractor to a repair station for servicing.

Some backup hydraulic systems are further implemented with an operational readiness test or feature that is automatically performed at machine startup to ensure proper functionality of the backup hydraulic system. In a typical operational readiness test, the auxiliary motor driving the backup hydraulic pump is briefly activated to determine if the resulting pressure supplied by the backup hydraulic pump is sufficient to take over the hydraulic system in a manner sufficient for convenience, safety, or the like.

Modern tractors are equipped with a 12 V electrical system and many incorporate a single auxiliary motor to drive such emergency pumps. However, the development of larger tractors has led to backup hydraulic pumps that require more electrical power than is feasible in the 12 V electrical system due to limitations in the available fuses and relays responsible for providing electricity to the single motor driving the emergency pump. Incorporating a single motor to drive the backup pump may therefore become cost-ineffective or non-feasible due to the disproportionately high cost of the motor, size of the motor, and corresponding amount of heat generated by the motor. Operation of a single auxiliary motor of the size needed to power the backup pump would result in significant heat generation, and the electrical system required to support such system would be expensive and would also add weight, cost, and unnecessary complexity to the vehicle.

Some hydraulic pump systems incorporate multiple mutually coupled motors that are simultaneously activated to drive a hydraulic pump. However, utilizing multiple motors has drawbacks because there are limitations to testing the operational readiness of such systems. In particular, testing the backup hydraulic system by simultaneously activating multiple motors can be misleading in the event one of the motors alone can drive the backup pump. As a result, there is need for a system and method for accurately and reliably testing the operational readiness of a hydraulic pump system including a pump driven by multiple mutually coupled motors.

SUMMARY

This Summary is provided to introduce a selection of concepts in a simplified form that are further described below in the Detailed Description. This Summary is not intended to identify key factors or essential features of the claimed subject matter, nor is it intended to be used to limit the scope of the claimed subject matter.

In one implementation, there is a readiness testing system for determining functionality of an associated hydraulic system including first and second motors mutually coupled in driving relation with a pump. The readiness testing system includes at least one sensor generating a signal representative of at least one monitored condition of the hydraulic system, and a controller operatively coupled with the at least one sensor, wherein the controller is in operative electrical communication with the first and second motors and configured to selectively control activation and deactivation of each of the first and second motors. The controller includes a processor, a memory device operatively coupled with the processor, and fitness detection logic stored in the memory device of the controller. The fitness detection logic is executable by the processor to determine the functionality of the hydraulic system by: determining, based on the signal while the first motor is activated and the second motor is deactivated during a first test interval, whether the at least one monitored condition meets a predefined threshold condition prior to expiration of the first test interval; determining, based on the signal while the second motor is activated and the first motor is deactivated during a second test interval, whether the at least one monitored condition meets the predefined threshold condition prior to expiration of the second test interval; and generating a readiness signal representative of the determined functionality of the hydraulic system based on whether the at least one monitored condition meets the predefined threshold condition during the first and second test intervals.

In another implementation, a method is provided for determining functionality of an associated hydraulic system including first and second motors mutually coupled in driving relation with a pump. The method includes generating, by at least one sensor, a signal representative of at least one monitored condition of the associated hydraulic system. The method further includes selectively controlling activation and deactivation of each of the first and second motors with a controller in operative electrical communication with the first and second motors and operatively coupled with the at least one sensor. The method further includes executing, by a processor of the controller, fitness detection logic stored in a memory device of the controller to determine the functionality of the associated hydraulic system. The fitness detection logic determines the functionality of the associated hydraulic system by determining, based on the signal while the first motor is activated and the second motor is deactivated during a first test interval, whether the at least one monitored condition meets a predefined threshold condition prior to expiration of the first test interval. The fitness detection logic further determines the functionality of the associated hydraulic system by determining, based on the signal while the second motor is activated and the first motor is deactivated during a second test interval, whether the at least one monitored condition meets the predefined threshold condition prior to expiration of the second test interval. The fitness detection logic further generates a readiness signal representative of the determined functionality of the associated hydraulic system based on whether the at least one monitored condition meets the predefined threshold condition during the first and second test intervals.

In another implementation, a non-transitory computer-readable storage medium is provided storing a set of instructions for determining functionality of an associated hydraulic system including first and second motors mutually coupled in driving relation with a pump. The instructions, when executed by one or more processors, cause a readiness testing system controller to perform steps for determining the functionality of an associated hydraulic system, wherein the steps include receiving from at least one sensor, a signal representative of at least one monitored condition of the associated hydraulic system. The steps for determining the functionality of an associated hydraulic system further include selectively controlling activation and deactivation of each of the first and second motors with the controller, wherein the controller is in operative electrical communication with the first and second motors and operatively coupled with the at least one sensor. The steps for determining the functionality of an associated hydraulic system further include determining the functionality of the associated hydraulic system by determining, based on the received signal while the first motor is activated and the second motor is deactivated during a first test interval, whether the at least one monitored condition meets a predefined threshold condition prior to expiration of the first test interval. The steps for determining the functionality of an associated hydraulic system further include determining, based on the received signal while the second motor is activated and the first motor is deactivated during a second test interval, whether the at least one monitored condition meets the predefined threshold condition prior to expiration of the second test interval. The steps for determining the functionality of an associated hydraulic system further include generating a readiness signal representative of the determined functionality of the associated hydraulic system based on whether the at least one monitored condition meets the predefined threshold condition during the first and second test intervals.

To the accomplishment of the foregoing and related ends, the following description and annexed drawings set forth certain illustrative aspects and implementations. These are indicative of but a few of the various ways in which one or more aspects may be employed. Other aspects, advantages and novel features of the disclosure will become apparent from the following detailed description when considered in conjunction with the annexed drawings.

BRIEF DESCRIPTION OF THE DRAWINGS

What is disclosed herein may take physical form in certain parts and arrangement of parts, and will be described in detail in this specification and illustrated in the accompanying drawings which form a part hereof and wherein.

DETAILED DESCRIPTION

Figure 1A:
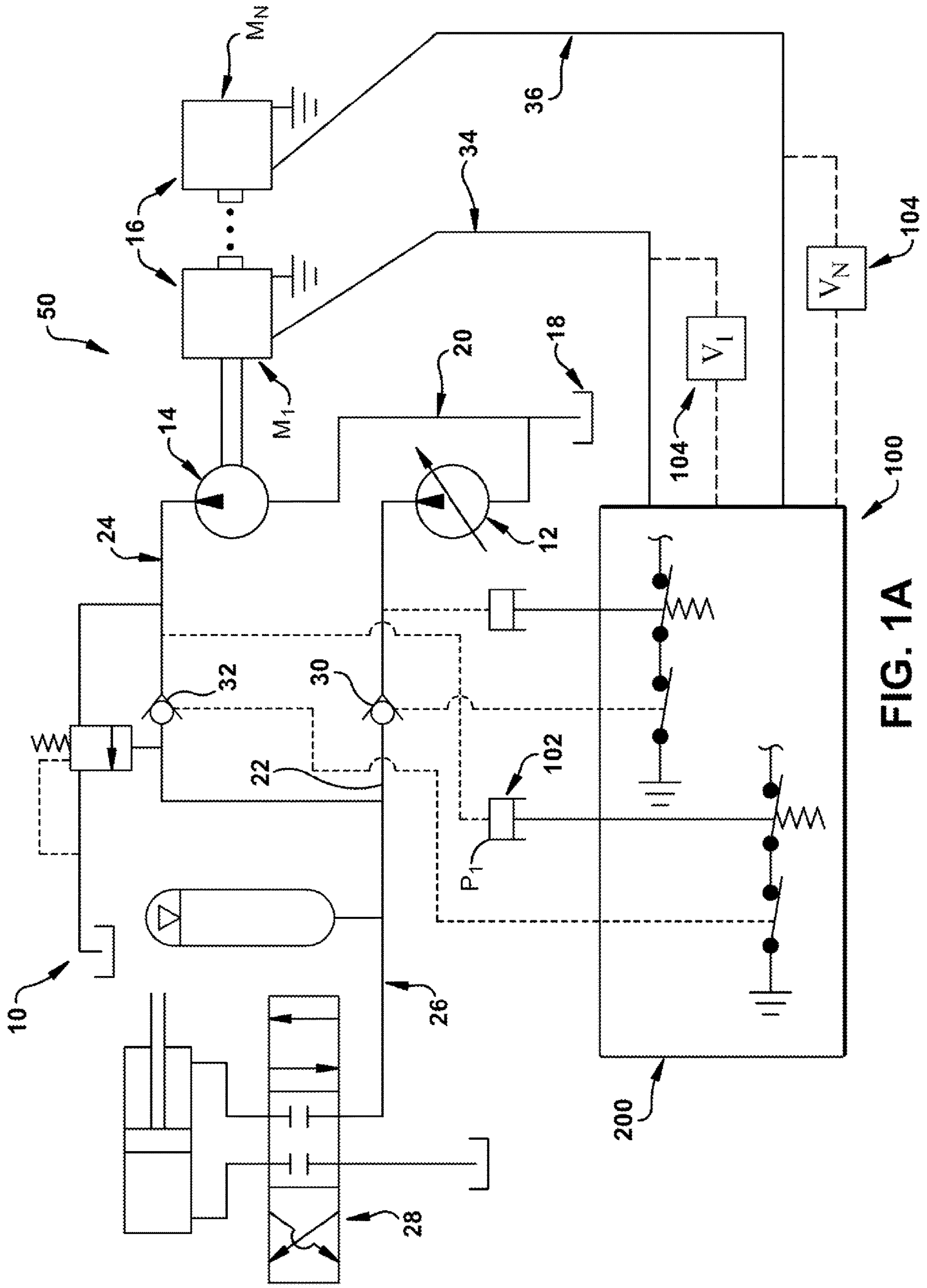
FIG. 1A is a schematic representation of a backup hydraulic system having a pump driven by multiple motors upon which the readiness testing system and method of this disclosure is applied.

The claimed subject matter is now described with reference to the drawings, wherein like reference numerals are generally used to refer to like elements throughout. In the following description, for purposes of explanation, numerous specific details are set forth in order to provide a thorough understanding of the claimed subject matter. It may be evident, however, that the claimed subject matter may be practiced without these specific details. In other instances, structures and devices are shown in block diagram form in order to facilitate describing the claimed subject matter.

The word "exemplary" is used herein to mean serving as an example, instance or illustration. Any aspect or design described herein as "exemplary" is not necessarily to be construed as advantageous over other aspects or designs. Rather, use of the word exemplary is intended to present concepts in a concrete fashion. As used in this application, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Further, at least one of A and B and/or the like generally means A or B or both A and B. In addition, the articles "a" and "an" as used in this application and the appended claims may generally be construed to mean "one or more" unless specified otherwise or clear from context to be directed to a singular form.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims. Of course, those skilled in the art will recognize many modifications may be made to this configuration without departing from the scope or spirit of the claimed subject matter.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure which performs the function in the herein illustrated exemplary implementations of the disclosure.

In addition, while a particular feature of the disclosure may have been disclosed with respect to only one of several implementations, such feature may be combined with one or more other features of the other implementations as may be desired and advantageous for any given or particular application. Furthermore, to the extent that the terms "includes," "having," "has," "with," or variants thereof are used in either the detailed description or the claims, such terms are intended to be inclusive in a manner similar to the term "comprising."

Provided herein is a readiness testing system, corresponding readiness testing method, and corresponding readiness testing computer readable medium storing instructions thereon that when executed by a processor perform steps for determining functionality of a backup hydraulic system including a plurality of motors mutually coupled in driving relation with a pump. As will be described in detail below, this disclosure provides a novel system and method for testing the functionality of the backup hydraulic system by activating each of the multiple mutually coupled motors individually while testing for hydraulic fluid pressure at the pump and/or testing for voltage across the deactivated motor(s). The test results may be communicated to other vehicle control systems and/or an operator.

Modern tractors physically and electrically limit the size and, thus, power of motors which can be used to drive the backup pump. One solution to driving the backup pump with multiple motors involves incorporating motors that, when running independently and/or individually, may lack the power to drive the backup pump but, when running together in combination, provide sufficient power to drive the backup pump so that the backup pump can power the emergency steering and brake control systems. Thus, a system and method according to this disclosure is advantageous for reasons such as it permits and realizes individual testing of the motors by selectively controlling the activation and deactivation of each of the motors.

The readiness testing system and corresponding method of this disclosure can be implemented in a work machine, such as a tractor, in a manner that minimizes design complexity and the overall costs of implementation, while improving the reliability (e.g., or accuracy) of the readiness testing system irrespective of the number of motors and the temperature. The system and method can be effectively implemented to directly measure conditions of the backup or emergency pump system without the need for high integration of onboard electronics and other circuitry required to indirectly monitor conditions, such as current. Moreover, the present disclosure provides means to perform the operational readiness test in a manner that reduces wear to the associated backup pump, fuses, and relays.

Figure 1B:
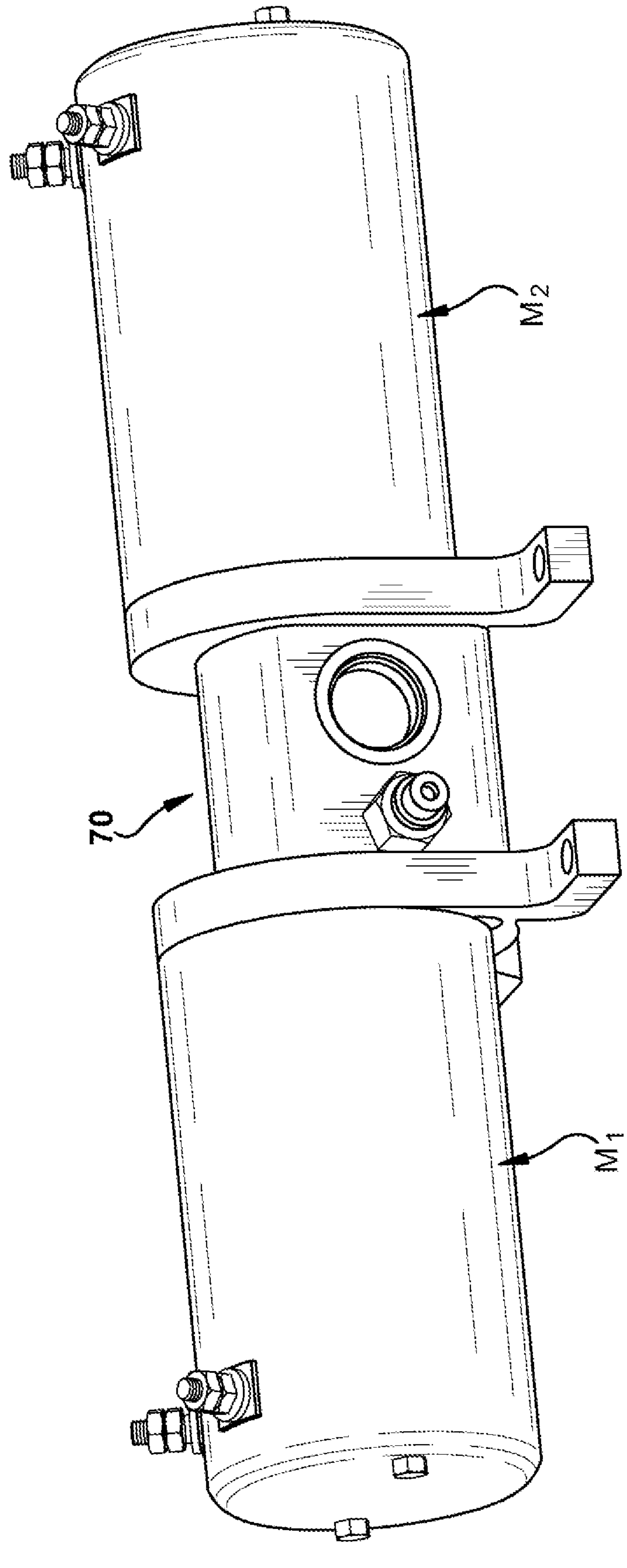
FIG. 1B is a diagrammatical view illustrating two electric motors that share a common shaft and which, in operation, are mutually coupled in driving relation with the pump of the backup hydraulic system of FIG. 1A.

FIG. 1A shows a schematic representation of a backup hydraulic system 50 having a pump 14 driven by multiple mutually coupled motors $M_1$-$M_N$, collectively at 16, upon which the readiness testing system 100 and corresponding method of this disclosure is applied. The backup hydraulic system 50 is incorporated into a hydraulic power steering system 10 including a main hydraulic pump 12 and a backup hydraulic pump 14. The main pump 12 is generally coupled to be driven by the vehicle engine in a conventional manner (not shown). The main pump 12 can be an engine driven or gear driven pump. The backup pump 14 is coupled for being driven by a plurality of electric motors $M_1$-$M_N$, where $N \geq 2$ as represented by a dotted line in the Figure, connected with the backup pump 14 by way of a common shaft. In the example embodiment, the plurality of electric motors $M_1$-$M_N$, where $N \geq 2$, are mutually coupled and also in the example embodiment, the plurality of electric motors $M_1$-$M_N$, where $N \geq 2$, are mutually coupled with the backup pump 14 by a connection such as a common shaft, gear, belt, or the like. FIG. 1B shows a first and second electric motor, $M_1$ and $M_2$, which are configured to be connected to the backup pump 14 by way of the common shaft 70. However, a backup hydraulic system 50 comprising two motors, $M_1$ and $M_2$, is merely for the purposes of illustration and the backup hydraulic system 50 may include more than two motors mutually coupled in driving relation with the backup pump 14. The plurality of electric motors $M_1$-$M_N$ that drive the backup pump 14 can be, but are not limited to, DC motors. The operation of the plurality of electric motors $M_1$-$M_N$, and hence the backup pump 14, can be controlled automatically by a controller 200.

The main pump 12 and the backup pump 14 can have respective inlets coupled to a sump 18 by means of a branched suction conduit 20. The main pump 12 is connected to outlet line 22 and the backup pump 14 is connected to outlet line 24. Outlet lines 22 and 24 are coupled to a branched feed conduit 26, which is coupled to a closed-center steering control valve 28. Respectively located in the respective outlet lines 22 and 24 are one-way check valves 30 and 32, which respectively operate to isolate the main pump 12 from the backup pump 14 and vice versa.

Operation of the plurality of electric motors $M_1$-$M_N$, and hence operation of the backup pump 14, is controlled automatically by means of a controller 200, here merely represented by a functional box for the sake of brevity. The controller 200 may be of any type capable of monitoring the condition of the fluid being supplied by the main pump 12 and backup pump 14. The controller 200 outputs current to the plurality of motors $M_1$-$M_N$ via lead lines 34 and 36, which activates (e.g., or energizes) the motors $M_1$-$M_N$, and by extension, the backup pump 14.

The main pump 12 is configured to supply power steering fluid to the steering system 10 of a vehicle such as, for example, a tractor. The backup pump 14 is configured to supply power steering fluid to the steering system 10 in the event of a failure of the main pump 12 to output sufficient fluid. In a tractor, for example, the backup pump 14, if called into service, may have to supply 22 L/min flow at 55 bar pressure to satisfy pump flow and pressure demands under nominal conditions. The backup pump 14 may comprise a gear pump, but is not so limited. The hydraulic power steering system 10 includes a readiness testing system 100 for determining the functionality of the associated backup hydraulic system 50. In one example embodiment, the readiness testing system 100 is configured to determine the operational readiness of the backup hydraulic system 50 by monitoring characteristics of the system 50 such as, for example, by monitoring fluid pressure output by the backup pump 14. In a further example embodiment, the readiness testing system 100 is configured to determine the operational readiness of the backup hydraulic system 50 by monitoring characteristics of the system 50 such as, for example, by monitoring a voltage (e.g., back EMF) associated with the activation and deactivation of the plurality of electric motors $M_1$-$M_N$. In yet a further example embodiment, the readiness testing system 100 is configured to determine the operational readiness of the backup hydraulic system 50 by monitoring a plurality of characteristics of the system 50 such as, for example, by monitoring fluid pressure output by the backup pump 14 and by monitoring a voltage (e.g., back EMF) associated with the activation and deactivation of the plurality of electric motors $M_1$-$M_N$.

One or more sensors are provided to monitor one or more conditions of the backup hydraulic system 50 such as, for example, fluid pressure and/or voltage, and to generate one or more signals representative of the monitored one or more conditions. In some embodiments, the readiness testing system 100 comprises a pressure sensor $P_1$, at 102, configured to detect the fluid pressure output by the backup pump 14 during activation of the electric motors $M_1$-$M_N$ in a manner described in detail below and to generate a signal representative of the monitored fluid pressure. In some embodiments, the readiness testing system 100 comprises one or more voltage sensors $V_1$-$V_N$, at 104, configured to detect the voltage across deactivated motors while one of the plurality of motors is activated (e.g., back EMF) and to generate a signal representative of the monitored voltage. In some embodiments, the readiness testing system 100 comprises a combination of a pressure sensor $P_1$ and one or more voltage sensors $V_1$-$V_N$. The pressure sensor $P_1$ may be included in a pressure sensor bank 224 and the voltage sensors $V_1$-$V_N$ may be included in a voltage sensor bank 226.

A controller 200 is operatively coupled with the pressure $P_1$ and/or voltage sensors $V_1$-$V_N$ and comprises a processor 202, a memory device 204 operatively coupled with the processor 202, and fitness detection logic 206 stored in the memory device 204. The controller 200 comprises an input/output 208 for receiving input from the sensors $P_1$ and/or $V_1$-$V_N$ and for generating signals representative of the functionality of the associated hydraulic system 50. If the controller 200 receives signals directly from the sensors $P_1$ and $V_1$-$V_N$, the readiness testing system 100 can check the functionality of the backup hydraulic system 50 immediately without having to rely on derived measurements. The controller 200 can be further configured to control the plurality of electric motors $M_1$-$M_N$ with the backup pump 14 connected thereto. As will be described in greater detail below, the controller 200 may also be programmed to set a predefined threshold condition and duration of test intervals.

Figure 2:
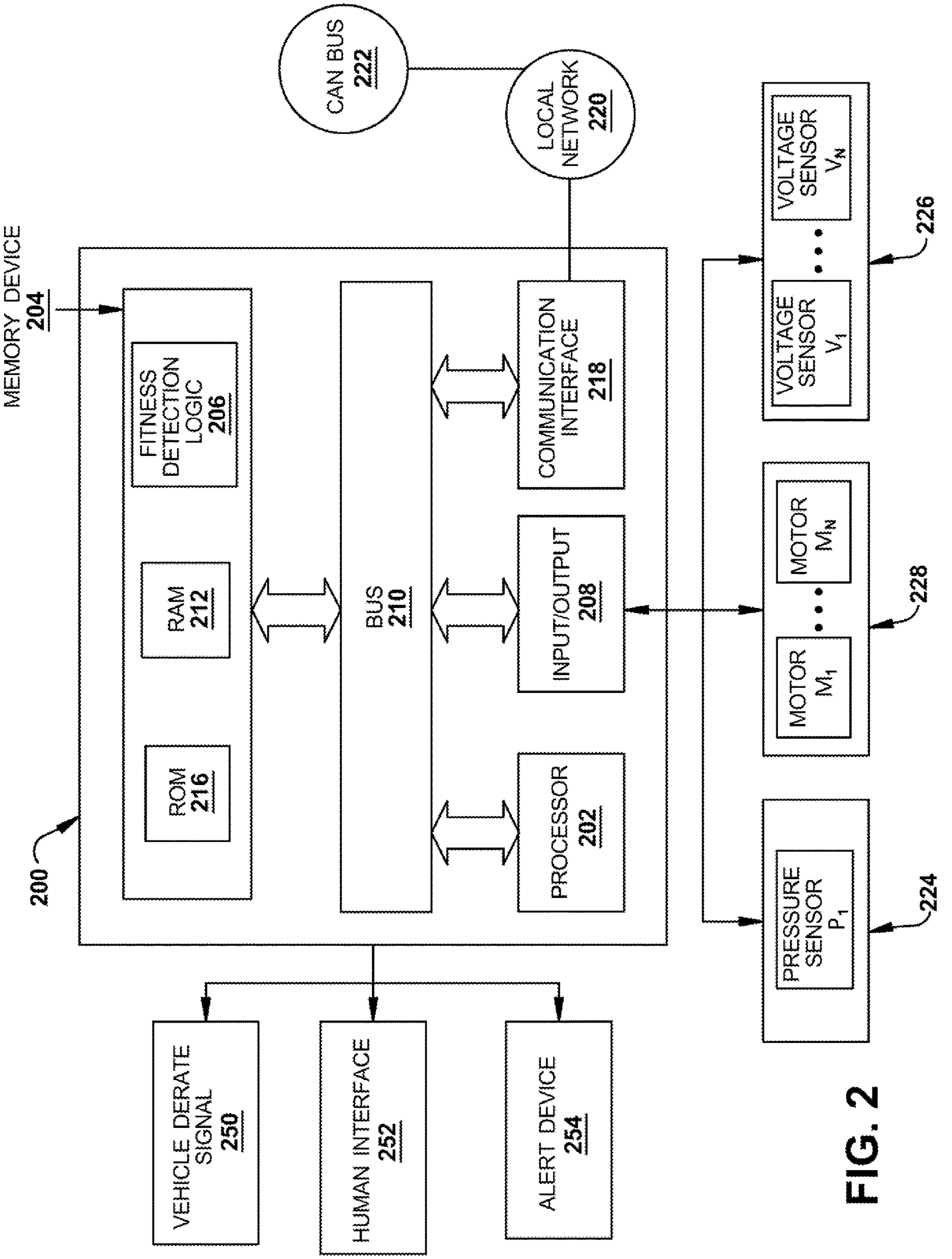
FIG. 2 is a block diagram of a controller configured to determine the functionality of a backup hydraulic system in accordance with an example embodiment of the present disclosure.

FIG. 2 is a block diagram of a controller 200 configured to determine the functionality of backup hydraulic system 50 in accordance with the present disclosure. The controller 200 is suitable for executing embodiments of one or more software systems or modules that are executable to provide a readiness testing system 100 and method for determining functionality of the associated hydraulic system 50 including a plurality of electric motors $M_1$-$M_N$, represented at 228, mutually coupled in driving relation with a backup pump 14.

The controller 200 can include a bus 210 or other communication mechanism for communicating information and a processor 202 coupled with the bus 210 for processing information. The controller 200 includes a main memory 204, which may comprise random access memory (RAM) 214 or other dynamic storage devices for storing information and instructions such as fitness detection logic 206 to be executed by the processor 202, and read only memory (ROM) 216 or other static storage device for storing static information and instructions for the processor 202. The main memory 204 may be a non-volatile memory device and operable to store information and instructions executable by the processor 202. The controller 200 can be programmed to set the duration of testing intervals and to set the values of the pressure and/or voltage thresholds, as will be described in greater detail below.

In some embodiments, the controller 200 may be located in a separate control box of the vehicle. In other embodiments, the readiness testing system 100 and corresponding fitness detection logic 206 are incorporated into existing controllers of the vehicle such as, for example, the overall steering and brake control system controllers. In some embodiments, control of the readiness testing system 100 may be assigned to one or more of the redundant safety critical controllers on the tractor. In this manner, the readiness testing system 100 comprises part of the overall steering and brake control system controllers such as, for example, the A and B box on a tractor.

Figure 3:
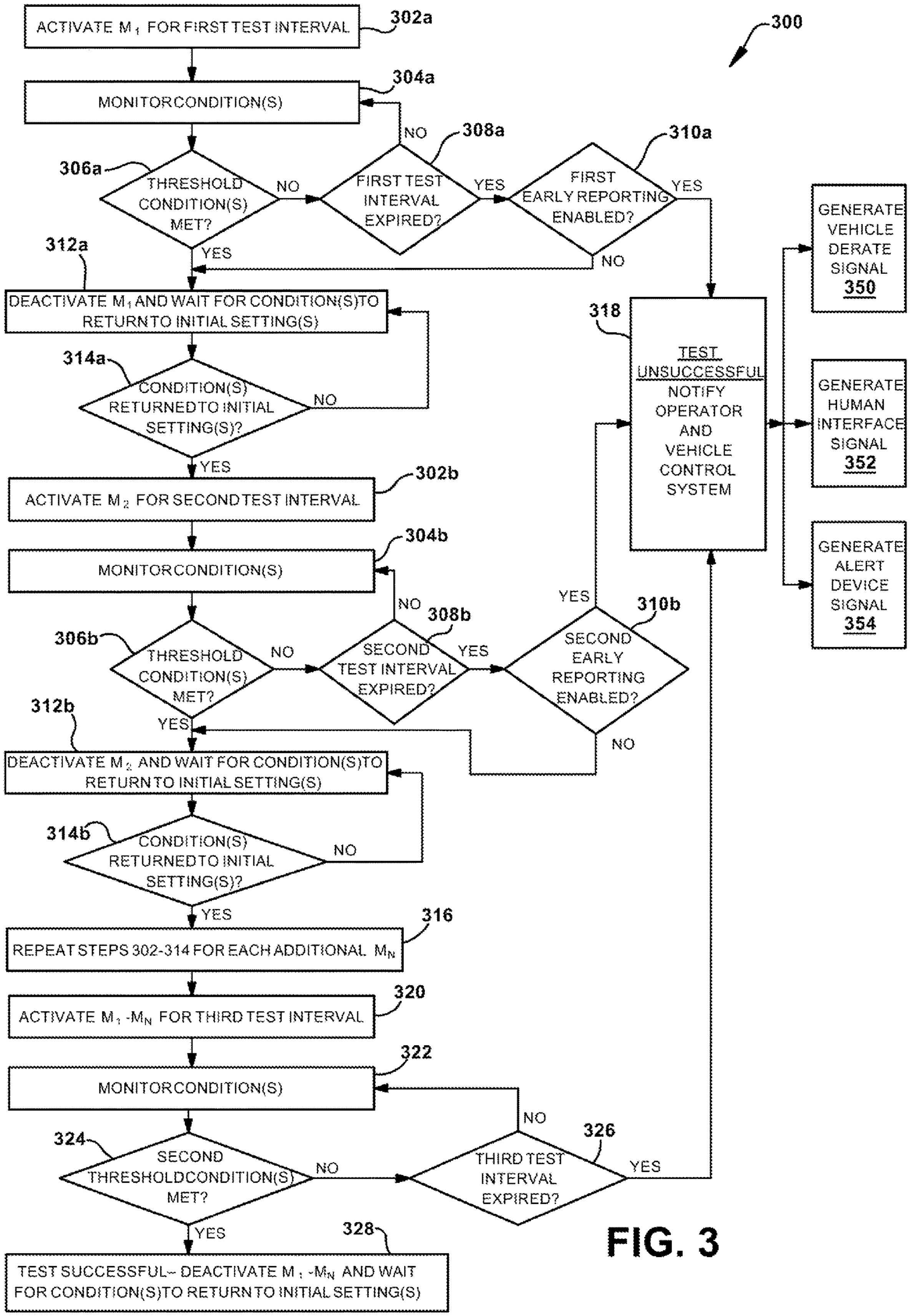
FIG. 3 is a flow diagram illustrating an embodiment of a general method for determining functionality of a backup hydraulic system according to an example embodiment of the present disclosure.

FIG. 3 is a flow diagram illustrating an embodiment 300 of a general readiness testing method for determining functionality of a backup hydraulic system 50 including a plurality of electric motors $M_1$-$M_N$ mutually coupled in driving relation with a backup pump 14. As will be described in greater detail below, the readiness testing system 100 is configured to determine the operational health or functionality of the backup hydraulic system 50 by automatically initiating an operational readiness test at either startup or first motion of the vehicle. It should be noted that the operational readiness test also can be initiated at periodic intervals or manually by a user. Furthermore, it should be understood that the backup pump 14 may be provided as a source of backup hydraulic power in the event the main pump 12 cannot supply sufficient power for reasons such as being deactivated, defected, damaged, or otherwise inoperable. For example, a properly functioning backup pump 14 is capable of supplying sufficient fluid to power a vehicle steering system, such as that shown in FIG. 1 at 10, to maintain steering control in the event of insufficient fluid supply from the main pump 12. It is to be appreciated that hydraulic steering is used herein as an example application and that the embodiments are not limited to only those systems but may be applied anywhere there is a desire or need for testing the operational readiness of a backup hydraulic pump system driven by multiple mutually coupled motors.

Referring now to step 302*a*, a first motor, $M_1$, receives a signal from the controller 200 that activates, or energizes (e.g., starts), $M_1$ for a first test interval. The first test interval may last for a predetermined duration which can be set by the controller 200. $M_1$ can be activated at either startup or first motion of the vehicle. At step 304*a*, the readiness testing system 100 monitors conditions such as, for example, the fluid pressure output by the backup pump 14 and/or the voltage across one or more of deactivated motors $M_N$, where $N \geq 2$, or back EMF, while $M_1$ is activated, or energized (e.g., running), and the other motors are deactivated. The fluid pressure can be monitored using a pressure sensor $P_1$ and the voltage can be monitored using at least one voltage sensor $V_N$, where N≥1. The pressure sensor $P_1$ and voltage sensors $V_N$, where N≥1, generate signals representative of the monitored pressure or voltage that are processed and analyzed by the controller 200.

At 306*a*, is the step of determining, while the first motor ($M_1$) is activated and the second motor ($M_2$) is deactivated during a first test interval, whether the at least one monitored condition meets a predefined threshold condition prior to expiration of the first test interval. In particular, the fitness detection logic 206 stored in the memory device 204 of the controller 200 is executed by the processor 202 to determine whether the at least one monitored condition meets the predefined threshold condition, or approximate the predefined threshold condition within acceptable limits, prior to the expiration of the first test interval. Although the readiness testing system 100 can monitor multiple conditions, for the sake of simplicity, assume a single condition is monitored. If the monitored condition meets the predefined threshold condition (e.g., within prescribed tolerances) prior to the expiration of the first test interval, the controller 200 designates the testing of $M_1$ as successful and the method 300 proceeds to step 312*a*. It should be recognized that a condition may continue to be monitored during the first test interval until either the predefined threshold is met or the first test interval expires. At 308*a*, is the step of determining whether the time of first test interval has expired. When the first test interval expires without the monitored condition meeting the predefined threshold of the condition, the test is unsuccessful.

At 310*a*, the method may include a first early reporting feature. If the first early reporting feature is enabled at 310*a*, the method can be terminated upon the occurrence of an unsuccessful test without completing the remaining steps of the method such as, for example, individually testing the remaining motors beginning at step 302*b*.

In response to successful testing of $M_1$, at step 312*a*, the controller 200 sends $M_1$ a signal to deactivate, or de-energize (e.g., shut off), and the method waits for the monitored condition to return to its initial setting or value before proceeding. For example, if the initial fluid pressure is approximately 0 bar, then the method will wait for the fluid pressure to return to the initial setting of approximately 0 bar. At 314*a*, is the step of determining whether the condition has returned to its initial setting. Preferably, the method waits to proceed to step 302*b* until after the monitored condition has returned to its initial setting.

At 302*b*, a second motor, $M_2$, receives a signal from the controller 200 that activates, or energizes (e.g., starts), $M_2$ for a second test interval. The second test interval may last for a predetermined duration which can be set by the controller 200. $M_2$ can be activated at either startup or at first motion of the vehicle. At step 304*b*, the readiness testing system 100 monitors conditions such as, for example, the fluid pressure output by the backup pump 14 and/or the voltage across one or more of deactivated motors $M_N$, where N≠2, or back EMF, while $M_2$ is activated, or energized (e.g., running), and the other motors are deactivated. The fluid pressure can be monitored using a pressure sensor $P_1$ and the voltage can be monitored using at least one voltage sensor $V_N$, where N≥1. The pressure sensor $P_1$ and voltage sensors $V_N$, where N≥1, generate signals representative of the monitored pressure and voltage that are processed and analyzed by the controller 200.

At 306*b*, is the step of determining, while the second motor $M_2$ is activated and the first motor $M_1$ is deactivated during a second test interval, whether the at least one monitored condition meets the predefined threshold condition prior to expiration of the second test interval. In particular, fitness detection logic 206 stored in the memory device 204 of the controller 200 is executed by the processor 202 to determine whether the at least one monitored condition meets the predefined threshold condition, or approximate the predefined threshold condition within acceptable limits, prior to the expiration of the second test interval. Assuming, for the sake of simplicity a single condition is monitored. If the monitored condition meets the predefined threshold condition (e.g., within prescribed tolerances) prior to the expiration of the second test interval, the controller 200 designates the testing of $M_2$ as successful and the method 300 proceeds to step 312*b*. It should be recognized that a condition may continue to be monitored during the second test interval until either the predefined threshold is met or the second test interval expires. At 308*b*, is the step of determining whether the time of the second test interval has expired. When the second test interval expires without the monitored condition meeting the predefined threshold of the condition, the test is unsuccessful.

At 310*b*, the method may include a second early reporting feature. If the second early reporting feature is enabled, the method can be terminated without testing the remaining motors beginning at step 316.

In response to successful testing of $M_2$, at step 312*b*, the controller 200 sends $M_2$ a signal to deactivate, or de-energize (e.g., shut off), and the method waits for the monitored condition to return to its initial setting or value. At 314*b*, is the step of determining whether the condition has returned to its initial setting. Preferably, the method waits to proceed to step 316 until after the monitored condition has returned to its initial setting. At step 316, the method repeats steps 302-314 for each additional electric motor $M_N$, where N≥3.

At 320, motors $M_1$-$M_N$ receive a signal from the controller 200 that activates, or energizes (e.g., starts), $M_1$-$M_N$ for a third test interval. The third test interval may last for a predetermined duration which can be set by the controller 200. At step 322, the readiness testing system 100 monitors conditions such as, for example, fluid pressure output by the backup pump 14 and/or the voltage (e.g., from back EMF). The fluid pressure can be monitored using a pressure sensor $P_1$ and the voltage can be monitored using at least one voltage sensor $V_N$, where N≥1. The pressure sensor $P_1$ and voltage sensors $V_N$, where N≥1, generate signals representative of the monitored pressure and voltage that are processed and analyzed by the controller 200.

At 324, is the step of determining, while all the motors $M_1$-$M_N$ are activated during the third test interval, whether the at least one monitored condition meets a predefined second threshold condition prior to expiration of the third test interval. In particular, the fitness detection logic 206 stored in the memory device 204 of the controller 200 is executed by the processor 202 to determine whether the at least one monitored condition meets the predefined second threshold condition, or approximate the predefined second threshold within acceptable limits, prior to the expiration of the third test interval. If the monitored condition meets the predefined second threshold (e.g., within prescribed tolerances) prior to the expiration of the third test interval, the controller 200 designates the testing of motors $M_1$-$M_N$ as successful and the method proceeds to step 328. A condition may continue to be monitored during the third test interval until either the predefined second threshold condition is met or the third test interval expires. At 326, is the step of determining whether the third test interval has expired. When the third test interval expires without the monitored condition meeting the predefined second threshold condition, the test is unsuccessful.

As described above, multiple conditions may be monitored. The method embodied at 300, may require all monitored conditions to reach their corresponding predefined threshold for a successful test (e.g., such as all monitored voltages and pressures meet the predefined threshold) or, the method may consider a test successful if one monitored condition reaches its corresponding predefined threshold (e.g., such as all monitored pressures meet the predefined threshold pressure but the monitored voltages do not). Advantages of monitoring multiple conditions can include providing testing redundancy and improving reliability. For example, assume both voltage and fluid pressure are monitored. If for some reason the readiness testing system 100 is only capable of monitoring one condition, such as pressure, due to a failed voltage sensor, then successful testing of the backup hydraulic system 50, or secondary hydraulic system, can occur based on satisfaction of the one condition. However, the readiness testing system 100 may require all monitored conditions to meet their corresponding predefined threshold for a successful test of the backup hydraulic system 50.

At 318, is the step of generating a signal representative of the determined functionality of the associated hydraulic system based on whether the at least one monitored condition failed to meet the predefined threshold during the first and second test intervals. Additionally, the signal can be generated based on whether the at least one monitored condition failed to meet the predefined second threshold during the third interval. The procedure, at 318, can be initiated in response to an unsuccessful test at any stage of the method (e.g., testing a single motor or multiple motors together) assuming early reporting 310*a* and 310*b* is enabled. The procedure can comprise notifying an operator and communicating the failed test (e.g., detected fault) to other control systems of the vehicle. For example, the controller 200 may generate a vehicle derate signal 350. In some embodiments, the vehicle is a tractor and the vehicle derate signal 350 causes the tractor to enter a derated driving state (e.g., tractor derated to 10 km/hr) in order to stay in compliance with ISO1099825199 and other EU standards. The controller 200 may also generate a human interface signal 352. The vehicle may include a human interface, such as a display screen, which may visually display the failed test by providing an error code or error description on the display screen. The controller 200 may also generate an alert device signal 354 to activate an alert device such as, for example, an audible alarm and/or flashing light to notify the operator of the failed test (e.g., detected fault). Additionally, the controller 200 and, in particular the communication interface 218, can be used to report the failed test (e.g., or detected fault) to the local network 220 and CAN bus 222. Essentially, the purpose is to alert the operator that redundancy does not exist (e.g., the backup pump is incapable of supplying sufficient emergency power to the steering and braking systems in the event of a failure of the main pump).

Figure 4A:
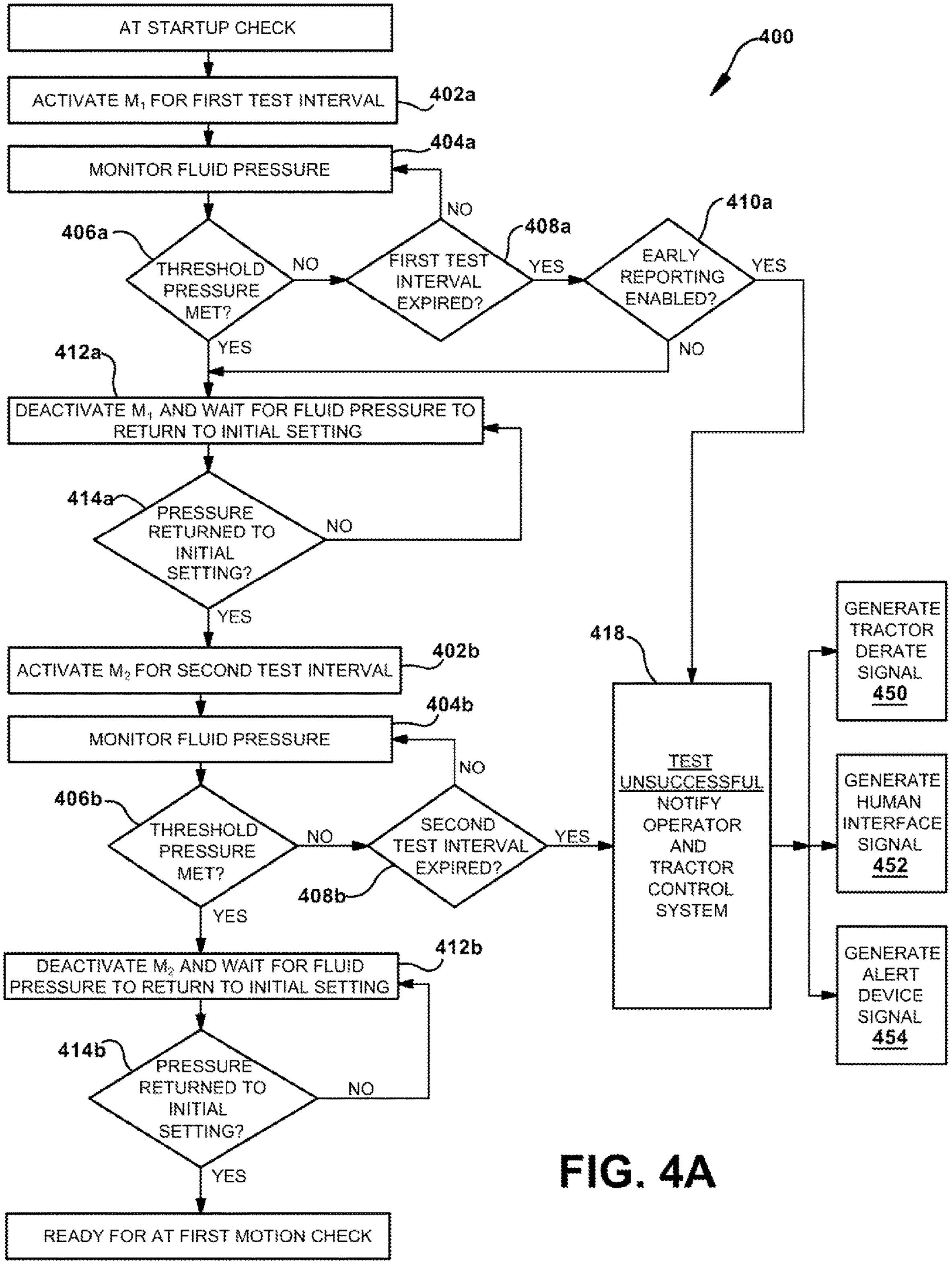
FIGS. 4A through 4C are flow diagrams illustrating an example embodiment of a method for determining the functionality of the backup hydraulic system of this disclosure by monitoring fluid pressure.
Figure 4B:
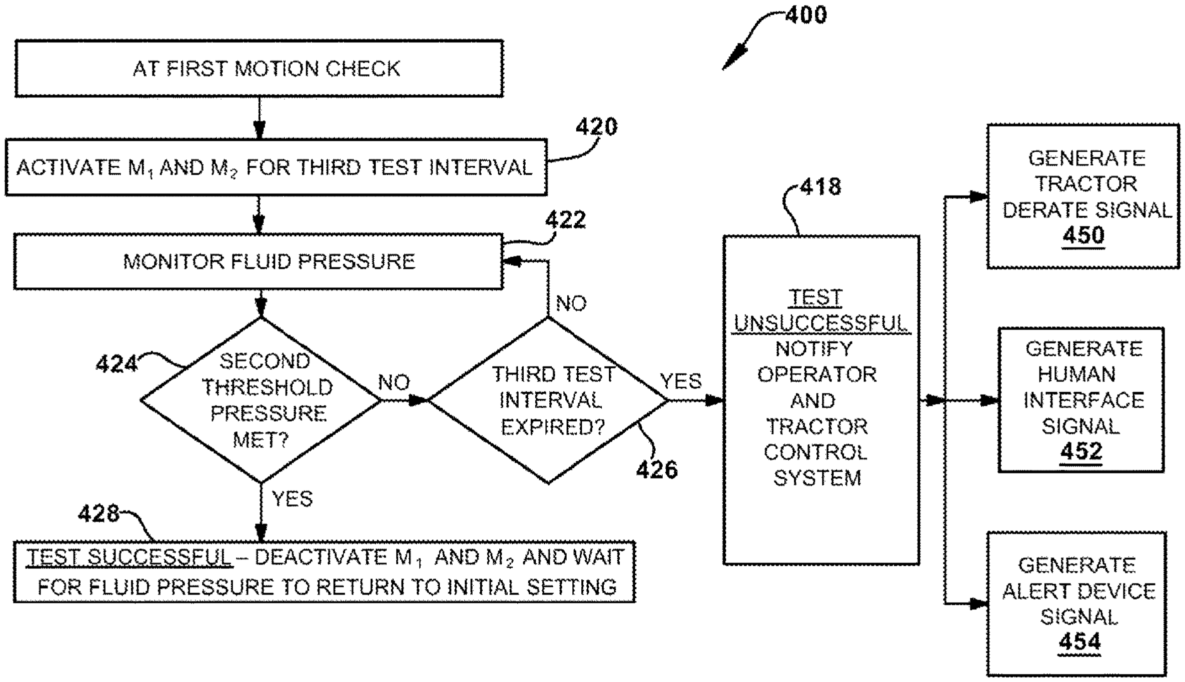
Figure 4C:
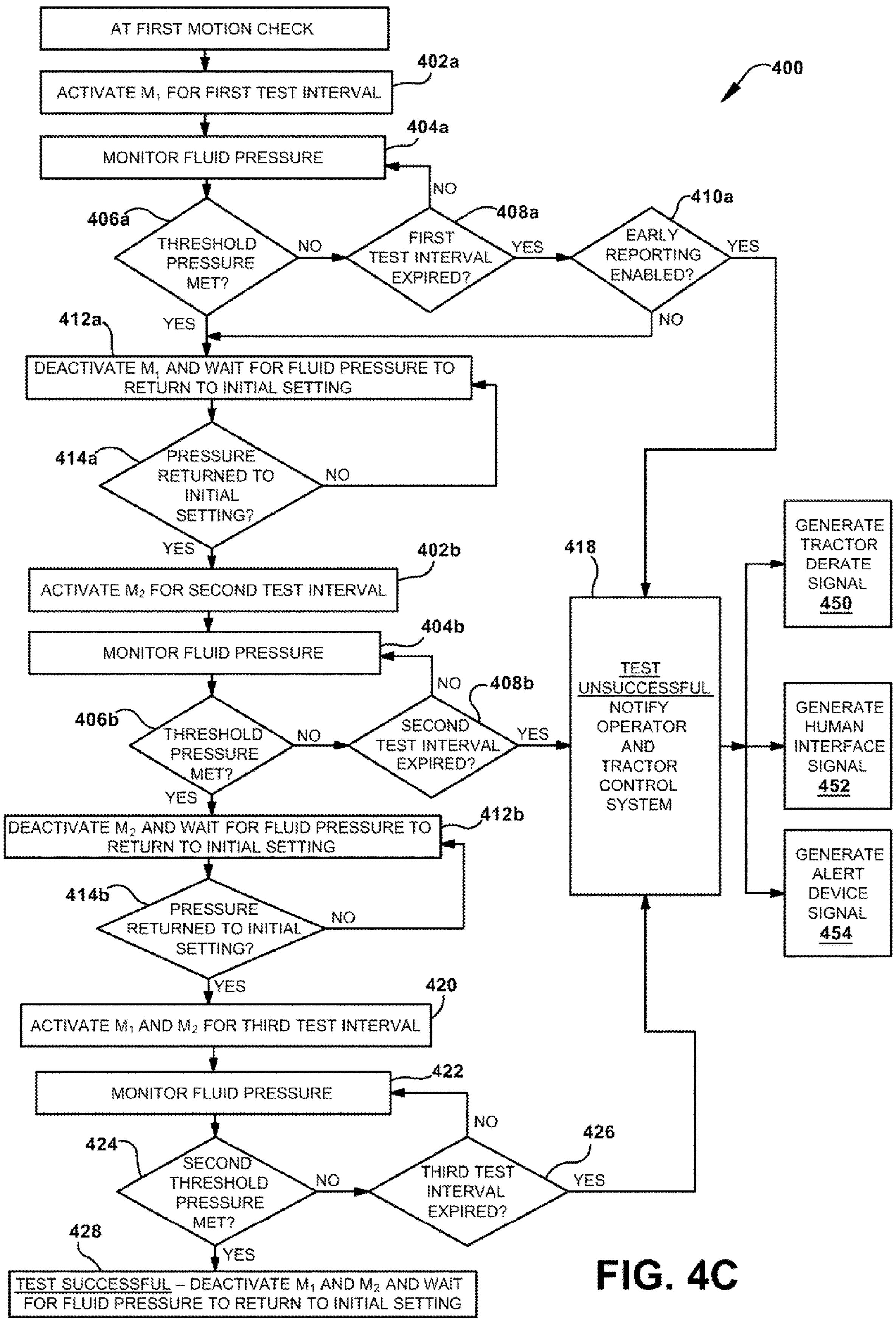

FIGS. 4A through 4C, are flow diagrams illustrating an example embodiment 400 of a method for determining the functionality of the backup hydraulic system 50 with a backup pump 14 driven by two motors $M_1$ and $M_2$, by monitoring fluid pressure. Referring now to those Figures, the method can be initiated, and performed in part, at startup of a tractor, as shown in FIG. 4A, with the remaining part of the method performed at first motion of the tractor, as shown in FIG. 4B. A startup check determines whether the individual motors are functional. A first motion check determines whether sufficient pump power is available when the motors are simultaneously activated.

In the example, the embodiment is disposed in a tractor application, but it is to be appreciated that the method is applicable to other vehicles and in other applications. It is worth noting that the method may be logically divided into a portion performed at startup checks, and a portion performed at first motion in order to limit the amount of time an operator must wait for startup checks to complete. Typically, emergency pump checks are performed as the operator starts driving the tractor. FIG. 4C is a flow diagram illustrating the entire method for determining the functionality of the backup hydraulic system 50, which is performed at first motion check. As a result, this first motion check determines whether each of the motors is functional and that, when both motors are operated, a sufficient supply of power is available.

It should be recognized that a difference between the flow diagrams of FIGS. 4A-4B and FIG. 4C is when the method is implemented and not necessarily how or the manner in which the method is performed, as the steps performed may be identical. As a result, the numbering of the steps in FIGS. 4A-4C is consistent throughout.

FIG. 4A is a flow diagram illustrating a first portion 400 of the method for determining the functionality of the backup hydraulic system 50, which is performed at startup check. At step 402*a*, a first motor, $M_1$, receives a signal from the controller 200 that activates, or energizes (e.g., starts), $M_1$ for a first test interval. Activation of $M_1$ causes an increase in fluid pressure output by the hydraulic backup pump 14. At step 404*a*, the readiness testing system 100 utilizes a pressure sensor $P_1$ to monitor the fluid pressure output by the backup pump 14 while $M_1$ is activated, or energized (e.g., running). The pressure sensor $P_1$ generates a signal representative of the monitored pressure that is processed and analyzed by the controller 200.

At 406*a*, is the step of determining, while the first motor $M_1$ is activated and the second motor $M_2$ is deactivated during a first test interval, whether the fluid pressure meets a predefined threshold pressure prior to expiration of the first test interval. In particular, fitness detection logic 206 stored in the memory device 204 of the controller 200 is executed by the processor 202 to determine whether the fluid pressure from the backup pump 14 meets the predefined threshold pressure, or approximate the predefined threshold pressure within acceptable limits, prior to the expiration of the first test interval. If the monitored pressure meets the predefined threshold pressure (e.g., within prescribed tolerances) prior to the expiration of the first test interval, the controller 200 designates the testing of $M_1$ successful and the method proceeds to step 412*a*.

Generally, the predefined pressure threshold for activation of a single, independent motor, for example $M_1$, is a relative proportion of the total fluid pressure demanded by the system from operation of the backup pump. In some implementations, the predefined pressure threshold for activation of a single, independent motor may be ½ of the fluid pressure demanded by the system from operation of the backup pump. However, in other embodiments the ratio may be other than ½. In one particular embodiment, the threshold pressure is ½ of 60 bar or 30 bar, however, other values for the predefined threshold pressure are envisioned in alternative embodiments. The controller 200 continues to monitor the fluid pressure during the first test interval until either the predefined threshold pressure is met or the first test interval expires.

At 408*a*, is the step of determining whether the time of first test interval has expired. When the first test interval expires without the monitored pressure meeting the predefined threshold pressure, the test is unsuccessful. The purpose of the threshold pressure is to establish that the motor, here $M_1$, is electrically connected and able to operate independently (e.g., $M_1$-$M_N$ can each be energized and spin, and function once activated).

At 410*a*, the method may include a first early reporting feature. If the first early reporting is enabled, the method can be terminated upon an unsuccessful test without activating the remaining motors.

In response to successful testing of $M_1$, at step 412*a*, the controller 200 sends $M_1$ a signal to deactivate, or de-energize (e.g., shut off), and the method waits for the fluid pressure to return to its initial setting or value. Alternatively, the controller 200 may cease to supply $M_1$ with a signal responsible for keeping $M_1$ activated, or energized. Deactivating $M_1$ at 412*a* prevents damage to $M_1$ and/or damage to the fuse that feeds $M_1$.

At 414*a*, is the step of determining whether the fluid pressure has returned to its initial setting, or value. For example, if the initial fluid pressure is approximately 0 bar, then the method will wait for the fluid pressure to return to the initial setting of approximately 0 bar. Preferably, the method waits to proceed to step 402*b* until after the fluid pressure has returned to its initial setting.

At 402*b*, a second motor, $M_2$, receives a signal from the controller 200 that activates, or energizes (e.g., starts), $M_2$ for a second test interval. Activation of $M_2$ causes an increase in fluid pressure output by the hydraulic backup pump 14. At step 404*b*, the readiness testing system 100 utilizes a pressure sensor $P_1$ to monitor the fluid pressure output by the backup pump 14 while $M_2$ is activated, or energized (e.g., running). The pressure sensor $P_1$ generates a signal representative of the monitored fluid pressure that is processed and analyzed by the controller 200.

At 406*b*, is the step of determining, while the second motor $M_2$ is activated and the first motor $M_1$ is deactivated during a second test interval, whether the fluid pressure meets the predefined threshold pressure prior to expiration of the second test interval. Fitness detection logic 206 stored in the memory device 204 of the controller 200 is executed by the processor 202 to determine whether the fluid pressure from the backup pump 14 meets the predefined threshold pressure, or approximate the predefined threshold pressure within acceptable limits, prior to the expiration of the second test interval. If the monitored pressure meets the predefined threshold pressure (e.g., within prescribed tolerances) prior to the expiration of the second test interval, the controller 200 designates the testing of $M_2$ successful and the method proceeds to step 412*b*. The predefined threshold pressure for $M_2$ at 406*b* can be identical to the threshold pressure for $M_1$ at 406*a*, but it is not required (e.g., motors $M_1$ and $M_2$ are mismatched and do not have the same rating). The controller 200 continues to monitor the fluid pressure during the second test interval until either the predefined threshold pressure is met or the second test interval expires. At 408*b*, is the step of determining whether the time of second test interval has expired. When the second test interval expires without the monitored pressure meeting the predefined threshold pressure, the test is unsuccessful.

The use of the threshold pressures as described above advantageously establishes that each of the motors, $M_1$-$M_N$, is electrically connected and able to operate independently (e.g., $M_1$-$M_N$ can each be energized and spin, and function to adequately drive the hydraulic circuit once activated when and/or if needed). On one hand, the predefined threshold pressure at 406*a* and 406*b* is selected or otherwise set to a value that permits its detection and observance over other sources of noise, bleed up, or pressures that could occur without the backup pump energized (e.g., running). On the other hand, the predefined threshold pressure at 406*a* and 406*b* is selected or otherwise set to a value that permits the fluid pressure to exceed the threshold value (triggering condition) quickly and reliably such that running motors $M_1$-$M_N$ independently does not increase the risk of overheating the fuse for that single side of the circuit because the fuse might be undersized to take the whole load for any length of time running against the relay valve in the circuit.

In response to successful testing of $M_2$, at step 412*b*, the controller 200 sends $M_2$ a signal to deactivate, or de-energize (e.g., shut off), and the method waits for the fluid pressure to return to its initial setting or value. Alternatively, the controller 200 may cease to supply $M_2$ with a signal responsible for keeping $M_2$ activated, or energized. Deactivating $M_2$ at 412*b* prevents damage to $M_2$ and/or damage to the fuse that feeds $M_2$.

At 414*b*, is the step of determining whether the fluid pressure has returned to its initial setting, or value. Preferably, the method waits to commence first motion check, shown in FIG. 4B, until after the fluid pressure has returned to its initial setting.

FIG. 4B shows a second portion of the method for determining the functionality of the backup hydraulic system 50, which is performed at first motion check. At 420, motors $M_1$ and $M_2$ receive a signal from the controller 200 that activates, or energizes (e.g., starts), $M_1$ and $M_2$ for a third test interval. Activation of $M_1$ and $M_2$ causes an increase in fluid pressure output by the hydraulic backup pump 14. At step 422, the readiness testing system 100 utilizes a pressure sensor $P_1$ to monitor the fluid pressure output by the backup pump 14 while both $M_1$ and $M_2$ are activated, or energized (e.g., running). The pressure sensor $P_1$ generates a signal representative of the monitored pressure that is processed and analyzed by the controller 200.

At step 424, is the step of determining, while the first and second motors $M_1$ and $M_2$ are activated during a third test interval, whether the fluid pressure meets a predefined second threshold pressure prior to expiration of the third test interval. The fitness detection logic 206 stored in the memory device 204 of the controller 200 is executed by the processor 202 to determine whether the fluid pressure meets the predefined second threshold pressure, or approximate the predefined second threshold pressure within acceptable limits, prior to the expiration of the third test interval. If the monitored pressure meets the predefined second threshold pressure (e.g., within prescribed tolerances) prior to the expiration of the third test interval, the controller 200 designates the testing of motors $M_1$-$M_2$ as successful and the method proceeds to step 428. The predefined second threshold pressure for the combined activation of multiple motors, $M_1$ and $M_2$, is a relative proportion of the total fluid pressure demanded by the system from operation of the backup pump 14. In some implementations, the predefined second threshold pressure for the concurrent energization of multiple motors may be ⅔ of the fluid pressure demanded by the system from operation of the backup pump 14. However, in other embodiments the ratio may other than ⅔. In one particular embodiment, the predefined second threshold pressure is ⅔ of 60 bar or 40 bar, however, other values for the predefined second threshold pressure are envisioned in alternative embodiments.

The predefined second threshold pressure for the combined activation of multiple motors, $M_1$ and $M_2$, is numerically greater than the predefined threshold pressure for activation of a single, independent motor, such as $M_1$ or $M_2$. Moreover, the predefined second threshold pressure represents what the hydraulic system can do with the multiple motors, here $M_1$ and $M_2$, operating together. Meeting the predefined second threshold pressure validates that the backup hydraulic system 50 is a sufficient standby power source to meet steering system, braking system, or other equivalent backup or secondary system requirements in the event the main system pump 12 cannot. The controller 200 continues to monitor the fluid pressure during the third test interval until either the predefined second threshold pressure is met or the third test interval expires.

At 426, the fault detection method determines whether the third test interval has expired. When the third test interval expires without meeting the predefined second threshold pressure, the test is unsuccessful.

At 418, is a procedure that can be initiated in response to an unsuccessful test at any stage of the method (e.g., testing a single motor or multiple motors together). The procedure in 418 is identical to that described in 318 above.

FIG. 4C shows a flow diagram of an embodiment 400 of a comprehensive method for determining the functionality of the backup hydraulic system 50, in which the steps from FIGS. 4A and 4B are combined in a single implementation performed at first motion check. Typically, redundant hydraulic system checks are performed as the operator starts driving the tractor. Although the method in FIGS. 4A-4C incorporates two motors, the method can be used to determine the operational health or functionality of the backup, or redundant hydraulic system driven by any number of electric motors.

Figure 5:
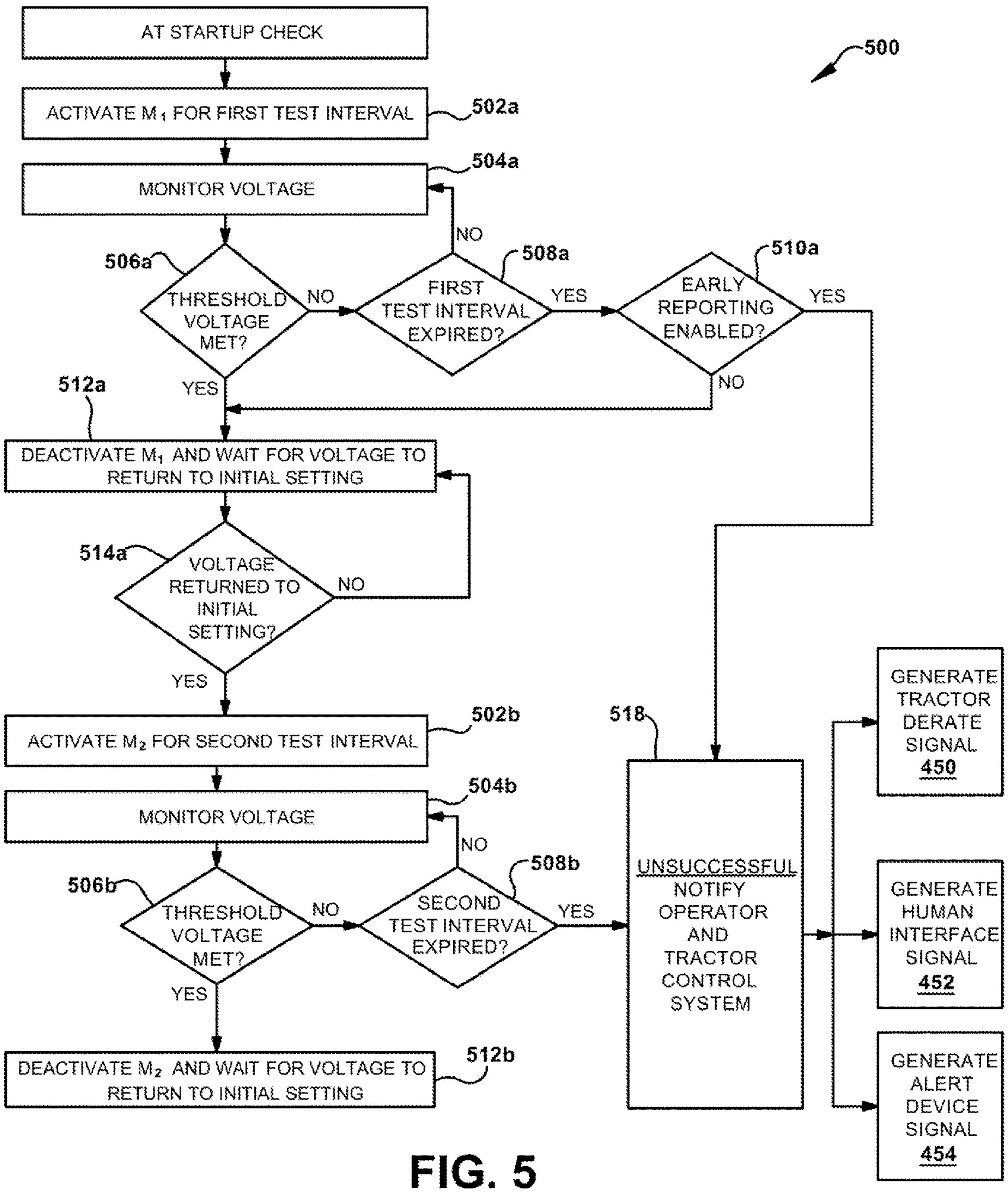
FIG. 5 is a flow diagram illustrating an example embodiment of a method for determining the functionality of the backup hydraulic system of this disclosure by monitoring voltage.

Referring now to FIG. 5, there is a flow diagram illustrating an example embodiment 500 of a method for determining the functionality of the backup hydraulic system 50 by monitoring voltage. The method can be initiated, and performed at startup of a tractor or at first motion of the tractor. It should be understood that the method in FIG. 5 is similar to that in FIG. 4, but for the monitored condition being voltage.

Activation of $M_1$, at 502*a*, for a first test interval, generates a voltage, or back EMF, across the deactivated motor, $M_2$. At step 504*a*, the readiness testing system 100 utilizes voltage sensor $V_2$ to monitor the voltage across the deactivated motor, $M_2$, while $M_1$ is activated, or energized (e.g., running). The voltage sensor $V_2$ generates a signal representative of the monitored voltage that is processed and analyzed by the controller 200.

At 506*a*, is the step of determining, while the first motor $M_1$ is activated and the second motor $M_2$ is deactivated during a first test interval, whether the voltage meets a predefined threshold voltage prior to expiration of the first test interval. Fitness detection logic 206 stored in the memory device 204 of the controller 200 is executed by the processor 202 to determine whether the voltage meets the predefined threshold voltage, or approximate the predefined threshold voltage within acceptable limits, prior to the expiration of the first test interval. If the monitored voltage meets the predefined threshold voltage (e.g., within prescribed tolerances) prior to the expiration of the first test interval, the controller 200 designates the testing of $M_1$ successful and the method proceeds to step 512*a*. The predefined threshold voltage is a relative proportion of the pre-existing 12 V system, which can vary between embodiments. The controller 200 continues to monitor the voltage during the first test interval until either the predefined threshold voltage is met or the first test interval expires. At 508*a*, the operational readiness testing method determines whether the first test interval has expired. When the first test interval expires without reaching the predefined threshold voltage, the test is unsuccessful.

At 510*a*, the method may include a first early reporting feature. If the first early reporting is enabled, the method can be terminated upon an unsuccessful test without activating the remaining motors.

In response to successful testing of $M_1$, at step 512*a*, the controller 200 sends $M_1$ a signal to deactivate, or de-energize (e.g., shut off), and the system waits for the predefined threshold voltage to return to its initial setting or value. Alternatively, the controller 200 may cease to supply $M_1$ with a signal responsible for keeping $M_1$ activated, or energized. Deactivating $M_1$ at 512*a* prevents damage to $M_1$ and/or damage to the fuse that feeds $M_1$.

At 514*a*, the readiness testing system 100 determines whether the voltage has returned to its initial setting, or value. Preferably, the method waits to proceed to step 502*b* until after the voltage has returned to its initial setting.

At 502*b*, a second motor, $M_2$, receives a signal from the controller 200 that activates, or energizes (e.g., starts), $M_2$ for a second test interval. Activation of $M_2$ generates a voltage, or back EMF, across the deactivated motor, $M_1$. At step 504*b*, the readiness testing system 100 utilizes voltage sensor $V_1$ to monitor the voltage across the deactivated motor, $M_1$, while $M_2$ is activated, or energized (e.g., running). The voltage sensor $V_1$ generates a signal representative of the monitored voltage that is processed and analyzed by the controller 200.

At 506*b*, is the step of determining, while the second motor $M_2$ is activated and the first motor $M_1$ is deactivated during a second test interval, whether the voltage meets a predefined threshold voltage prior to expiration of the second test interval. Fitness detection logic 206 stored in the memory device 204 of the controller 200 is executed by the processor 202 to determine whether the voltage meets the predefined threshold voltage, or approximate the predefined threshold voltage within acceptable limits, prior to the expiration of the second test interval. If the monitored voltage meets the predefined threshold voltage (e.g., within prescribed tolerances) prior to the expiration of the second test interval, the controller 200 designates the testing of $M_2$ successful and the method proceeds to step 512*b*. The predefined threshold voltage for $M_2$ at 512*b* can be identical to the predefined threshold voltage for $M_1$ at 512*a*, but it is not required. In this particular embodiment, the predefined threshold voltage is a relative proportion of the pre-existing 12 V system, which can vary between embodiments. The controller 200 continues to monitor the voltage during the second test interval until either the predefined threshold voltage is met or the second test interval expires. At 508*b*, the method determines whether the second test interval has expired. When the test interval expires without meeting the predefined threshold voltage, the test is unsuccessful.

A benefit of using the threshold voltage in a manner as describe above is that it establishes that each of the motors, $M_1$-$M_N$, is electrically connected and that each is able to operate independently (e.g., $M_1$-$M_N$ can each be energized and spin, and function once activated). On one hand, the threshold voltage may be set to a value that permits its detection and observance over other sources. On the other hand, the threshold voltage may be set to a value that permits the voltage to exceed the threshold value (triggering condition) quickly and reliably such that running motors $M_1$-$M_N$ independently does not increase the risk of overheating the fuse for that single side of the circuit because the fuse might be undersized to take the whole load for any length of time running against the relay valve in the circuit.

In response to successful testing of $M_2$, at step 512*b*, the controller 200 sends $M_2$ a signal to deactivate, or de-energize (e.g., shut off), and the system waits for the voltage to return to its initial setting or value. Alternatively, the controller 200 may cease to supply $M_2$ with a signal responsible for keeping $M_2$ activated, or energized. Deactivating $M_2$ at 512*b* prevents damage to $M_2$ and/or damage to the fuse that feeds $M_2$.

Figure 6:
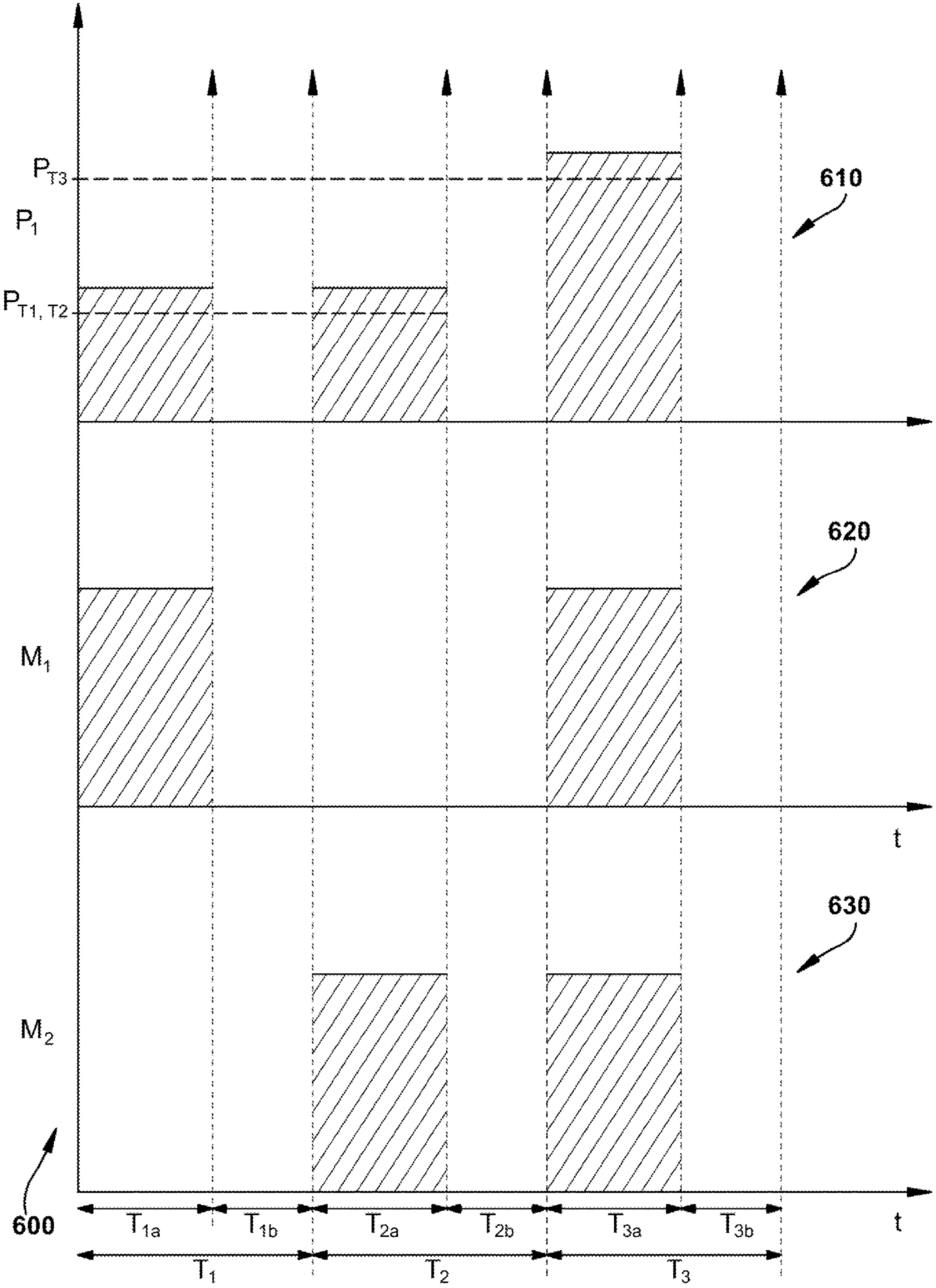
FIG. 6 is a timing diagram illustrating an example implementation of a readiness testing system in a backup hydraulic pump system comprising selectively activating and deactivating motors during predetermined test intervals and monitoring the corresponding fluid pressure generated in accordance with an example embodiment of the present disclosure.

FIG. 6 is a timing diagram 600 illustrating the implementation of a readiness testing system 100 in a backup hydraulic pump system 50 comprising selectively activating and deactivating motors $M_1$ and $M_2$ for a predetermined duration during designated test intervals and monitoring the corresponding pressure generated and/or voltage produced. The timing diagram 600 includes a pressure versus time axis 610, a first motor operation versus time axis 620, and a second motor versus time axis 630. As can be seen in the Figure, each of the axes 610, 620, and 630 are overlaid on the time axis in the time dimension.

During the first test interval $T_1$, the first motor $M_1$ is selectively activated during the subinterval $T_{1a}$ and $M_1$ is selectively deactivated during subinterval $T_{1b}$. The second motor $M_2$ remains deactivated throughout the entirety of the first test interval $T_1$.

Activation of $M_1$ during subinterval Tia causes an increase in fluid pressure output by the hydraulic backup pump 14. The increase in fluid pressure is monitored by the pressure sensor $P_1$ to determine if the measured pressure meets the predefined threshold pressure $P_{T1}$ prior to expiration of the first test interval $T_1$. In this particular example, the measured pressure exceeds the predefined threshold pressure $P_{T1}$ during the first test interval $T_1$.

Activation of $M_1$ during subinterval Tia also generates a voltage, or back EMF, across the deactivated motor, $M_2$. Although not shown, the generated voltage is monitored by the voltage sensor $V_2$ to determine if the measured voltage meets the predefined threshold voltage prior to expiration of the first test interval $T_1$. The voltage monitoring can be performed in lieu of pressure monitoring or in combination with pressure monitoring thereby serving as a redundant, or backup, operational readiness testing measure.

In response to successful testing of $M_1$, the controller 200 sends $M_1$ a signal to deactivate, or de-energize (e.g., shut off) during subinterval $T_{1b}$ and the operational readiness system 100 waits for the fluid pressure to return to its initial setting or value.

During the second test interval $T_2$, the second motor $M_2$ is selectively activated during the subinterval $T_2$a and $M_2$ is selectively deactivated during subinterval $T_2$b. The first motor $M_1$ remains deactivated throughout the entirety of the second test interval $T_2$.

Activation of $M_2$ during subinterval $T_2$a causes an increase in fluid pressure output by the hydraulic backup pump 14. The increase in fluid pressure is monitored by the pressure sensor $P_1$ to determine if the measured pressure meets the predefined threshold pressure $P_{T2}$ prior to expiration of the second test interval $T_2$. In this particular example, the measured pressure exceeds the predefined threshold pressure $P_{T2}$ during the second test interval $T_2$.

Activation of $M_2$ during subinterval $T_2$a also generates a voltage, or back EMF, across the deactivated motor, $M_1$. Although not shown, the generated voltage is monitored by the voltage sensor $V_1$ to determine if the measured voltage meets the predefined threshold voltage prior to expiration of the second test interval $T_2$. The voltage monitoring can be performed in lieu of pressure monitoring or in combination with pressure monitoring thereby serving as a redundant, or backup, operational readiness testing measure.

In response to successful testing of $M_2$, the controller 200 sends $M_2$ a signal to deactivate, or de-energize (e.g., shut off) during subinterval $T_2$b and the operational readiness system 100 waits for the fluid pressure to return to its initial setting or value.

During the third test interval $T_3$, the first and second motors are simultaneously activated during the subinterval $T_3$a. The concurrent activation of $M_1$ and $M_2$ during subinterval $T_3$a causes an increase in fluid pressure output by the hydraulic backup pump 14. This increase in fluid pressure is monitored by the pressure sensor $P_1$ to determine if the measured pressure meets the predefined threshold pressure $P_{T3}$ prior to expiration of the third test interval $T_3$. The predefined threshold pressure $P_{T3}$ is numerically greater than the threshold pressures $P_{T1}$ and $P_{T2}$ because $P_{T3}$ represents a pressure threshold for both motors $M_1$ and $M_2$ running at the same time while $P_{T1}$ and $P_{T2}$ represent a threshold pressure for the activation of a single motor, either $M_1$ or $M_2$. Reaching the predefined threshold pressure $P_{T3}$ validates that the backup hydraulic system 50 is a sufficient standby power source to meet steering and braking system requirements in the event the main pump 12 cannot. In this particular example, the measured pressure exceeds the threshold pressure $P_{T3}$ during the third test interval $T_3$.

In response to successful testing of $M_1$ and $M_2$, the controller 200 sends $M_1$ and $M_2$ a signal to deactivate, or de-energize (e.g., shut off) during subinterval $T_3$b and the operational readiness system 100 waits for the fluid pressure to return to its initial setting or value.

The implementations have been described, hereinabove. It will be apparent to those skilled in the art that the above methods and apparatuses may incorporate changes and modifications without departing from the general scope of this invention. It is intended to include all such modifications and alterations in so far as they come within the scope of the appended claims or the equivalents thereof.

What is claimed is:

1. A readiness testing system for determining a functionality of an associated hydraulic system including first and second motors ($M_1$ and $M_2$) mutually coupled in driving relation with a pump, the readiness testing system comprising:

at least one sensor ($P_1$ and/or $V_N$) generating a signal representative of at least one monitored condition of the associated hydraulic system; and a controller operatively coupled with the at least one sensor ($P_1$ and/or $V_N$), wherein the controller is in operative electrical communication with the first and second motors ($M_1$ and $M_2$) and configured to selectively control activation and deactivation of each of the first and second motors ($M_1$ and $M_2$), the controller comprising:

a processor;

a memory device operatively coupled with the processor; and a fitness detection logic stored in the memory device of the controller, the fitness detection logic being executable by the processor to determine the functionality of the associated hydraulic system by:

(i) determining, based on the signal while the first motor ($M_1$) is activated and the second motor ($M_2$) is deactivated and driven by the first motor ($M_1$) during a first test interval, whether the at least one monitored condition meets a predefined threshold condition prior to expiration of the first test interval;

(ii) determining, based on the signal while the second motor ($M_2$) is activated and the first motor ($M_1$) is deactivated and driven by the second motor ($M_2$) during a second test interval, whether the at least one monitored condition meets the predefined threshold condition prior to expiration of the second test interval; and (iii) generating a readiness signal representative of the determined functionality of the associated hydraulic system based on whether the at least one monitored condition meets the predefined threshold condition during the first and second test intervals.

2. The readiness testing system of claim 1, wherein:

the fitness detection logic is further executable by the processor to determine the functionality of the associated hydraulic system by:

determining, based on the signal while the first and second motors are activated during a third test interval, whether the at least one monitored condition meets a second predefined threshold condition prior to expiration of the third test interval.

3. The readiness testing system of claim 2, wherein:

the fitness detection logic is further executable by the processor to determine the functionality of the associated hydraulic system by:

determining, based on the signal while the first and second motors are activated during the third test interval, whether the at least one monitored condition meets a second predefined threshold condition greater than the first predetermined threshold prior to the expiration of the third test interval.

4. The readiness testing system of claim 1, wherein the at least one monitored condition comprises one or more of:

a first voltage generated by the first motor ($M_1$) while the second motor ($M_2$) is activated back-driving the mutually coupled first motor ($M_1$); and/or a second voltage generated by the second motor ($M_2$) while the first motor ($M_1$) is activated back-driving the mutually coupled first motor ($M_1$).

5. The readiness testing system of claim 1, wherein:

the at least one sensor comprises a pressure sensor ($P_1$) generating a signal representative of a fluid pressure in the associated hydraulic system.

6. The readiness testing system of claim 1, wherein:

the at least one sensor comprises:

a first voltage sensor ($V_1$) generating a first signal representative of a first voltage at the first motor ($M_1$) of the associated hydraulic system; and a second voltage sensor ($V_2$) generating a second signal representative of a second voltage at the second motor ($M_2$) of the associated hydraulic system; and the fitness detection logic is executable by the processor to determine the functionality of the associated hydraulic system by:

(i) determining, based on the second signal while the first motor ($M_1$) is activated and the second motor ($M_2$) is deactivated during the first test interval, whether the second voltage at the second motor ($M_2$) meets a predefined threshold voltage condition prior to expiration of the first test interval;

(ii) determining, based on the first signal while the second motor ($M_2$) is activated and the first motor ($M_1$) is deactivated during the second test interval, whether the first voltage at the first motor ($M_1$) meets the predefined threshold voltage condition prior to expiration of the second test interval; and (iii) generating the readiness signal representative of the determined functionality of the associated hydraulic system based on whether the first and second signals representative of the first and second voltages at the first and second motors ($M_1$, $M_2$) of the associated hydraulic system meet the predefined threshold voltage condition during the first and second test intervals.

7. The readiness testing system of claim 1, wherein the generated readiness signal representative of the determined functionality of the associated hydraulic system comprises one or more of:

a vehicle derate signal;

a human interface signal; and/or an alert device signal.

8. The readiness testing system of claim 1, wherein:

the first and second motors comprise direct current (DC) electric motors.

9. A method for determining a functionality of an associated hydraulic system including first and second motors ($M_1$ and $M_2$) mutually coupled in driving relation with a pump, the method comprising:

generating, by at least one sensor ($P_1$ and/or $V_N$), a signal representative of at least one monitored condition of the associated hydraulic system;

selectively controlling activation and deactivation of each of the first and second motors ($M_1$ and $M_2$) with a controller in operative electrical communication with the first and second motors ($M_1$ and $M_2$) and operatively coupled with the at least one sensor ($P_1$ and/or $V_N$); and executing, by a processor of the controller, a fitness detection logic stored in a memory device of the controller to determine the functionality of the associated hydraulic system by:

(i) determining, based on the signal while the first motor ($M_1$) is activated and the second motor ($M_2$) is deactivated and driven by the first motor ($M_1$) during a first test interval, whether the at least one monitored condition meets a predefined threshold condition prior to expiration of the first test interval;

(ii) determining, based on the signal while the second motor ($M_2$) is activated and the first motor ($M_1$) is deactivated and driven by the second motor ($M_2$) during a second test interval, whether the at least one monitored condition meets the predefined threshold condition prior to expiration of the second test interval; and (iii) generating a readiness signal representative of the determined functionality of the associated hydraulic system based on whether the at least one monitored condition meets the predefined threshold condition during the first and second test intervals.

10. The method of claim 9, further comprising executing the fitness detection logic by the processor to determine the functionality of the associated hydraulic system by:

determining, based on the signal while the first and second motors ($M_1$ and $M_2$) are activated during a third test interval, whether the at least one monitored condition meets a second predefined threshold condition prior to expiration of the third test interval.

11. The method of claim 10, wherein the determining comprises:

determining whether the at least one monitored condition meets a second predefined threshold condition greater than the first predefined threshold condition prior to the expiration of the third test interval.

12. The method of claim 9, wherein:

the generating the signal representative of the at least one monitored condition comprises:

generating the signal representative of the at least one monitored condition using a pressure sensor ($P_1$) monitoring a fluid pressure in the associated hydraulic system.

13. The method of claim 9, wherein:

the generating the signal representative of the at least one monitored condition comprises:

generating a first signal representative of the at least one monitored condition using a first voltage sensor ($V_1$) monitoring a first voltage at the first motor ($M_1$) of the associated hydraulic system; and generating a second signal representative of the at least one monitored condition using a second voltage sensor ($V_2$) monitoring a second voltage at the second motor ($M_2$) of the associated hydraulic system;

the executing the fitness detection logic by the processor comprises executing the fitness detection logic by the processor to determine the functionality of the associated hydraulic system by:

(i) determining, based on the second signal while the first motor ($M_1$) is activated and the second motor ($M_2$) is deactivated during the first test interval, whether the second voltage at the second motor ($M_2$) meets a predefined threshold voltage condition prior to expiration of the first test interval;

(ii) determining, based on the first signal while the second motor ($M_2$) is activated and the first motor ($M_1$) is deactivated during the second test interval, whether the first voltage at the first motor ($M_1$) meets the predefined threshold voltage condition prior to expiration of the second test interval; and (iii) generating the readiness signal representative of the determined functionality of the associated hydraulic system based on whether the first and second signals representative of the first and second voltages at the first and second motors ($M_1$, $M_2$) of the associated hydraulic system meet the predefined threshold voltage condition during the first and second test intervals.

14. The method of claim 9, wherein the generating the readiness signal representative of the determined functionality of the associated hydraulic system comprises generating one or more of:

a vehicle derate signal;

a human interface signal; and/or an alert device signal.

15. A non-transitory computer-readable storage medium storing a set of instructions for determining a functionality of an associated hydraulic system including first and second motors ($M_1$ and $M_2$) mutually coupled in driving relation with a pump, the instructions, when executed by one or more processors, causing a readiness testing system controller to perform a method comprising:

receiving from at least one sensor ($P_1$ and/or $V_N$), a signal representative of at least one monitored condition of the associated hydraulic system;

selectively controlling activation and deactivation of each of the first and second motors ($M_1$ and $M_2$) with the controller, wherein the controller is in operative electrical communication with the first and second motors ($M_1$ and $M_2$) and operatively coupled with the at least one sensor ($P_1$ and/or $V_N$); and determining the functionality of the associated hydraulic system by:

(i) determining, based on the received signal while the first motor ($M_1$) is activated and the second motor ($M_2$) is deactivated and driven by the first motor ($M_1$) during a first test interval, whether the at least one monitored condition meets a predefined threshold condition prior to expiration of the first test interval;

(ii) determining, based on the received signal while the second motor ($M_2$) is activated and the first motor ($M_1$) is deactivated and driven by the second motor ($M_2$) during a second test interval, whether the at least one monitored condition meets the predefined threshold condition prior to expiration of the second test interval; and (iii) generating a readiness signal representative of the determined functionality of the associated hydraulic system based on whether the at least one monitored condition meets the predefined threshold condition during the first and second test intervals.

16. The non-transitory computer-readable storage medium of claim 15, wherein set of instructions is further executable by the processor to determine the functionality of the associated hydraulic system by:

determining, based on the received signal while the first and second motors are activated during a third test interval, whether the at least one monitored condition meets a second predefined threshold condition prior to expiration of the third test interval.

17. The non-transitory computer-readable storage medium of claim 16, wherein the determining comprises:

determining whether the at least one monitored condition meets a second predefined threshold condition greater than the first predefined threshold condition prior to the expiration of the third test interval.

18. The non-transitory computer-readable storage medium of claim 15, wherein the at least one monitored condition comprises one or more of:

a first voltage generated by the first motor ($M_1$) while the second motor ($M_2$) is activated back-driving the first motor ($M_1$), and/or a second voltage generated by the second motor ($M_2$) while the first motor ($M_1$) is activated back-driving the second motor ($M_2$).

19. The non-transitory computer-readable storage medium of claim 15, wherein the receiving the signal representative of the at least one monitored condition of the associated hydraulic system comprises receiving a signal representative of a fluid pressure in the associated hydraulic system from a pressure sensor ($P_1$) operatively coupled with the associated hydraulic system.

20. The non-transitory computer-readable storage medium of claim 15, wherein:

the at least one sensor comprises:

a first voltage sensor ($V_1$) generating a first signal representative of a first voltage at the first motor ($M_1$) of the associated hydraulic system; and a second voltage sensor ($V_2$) generating a second signal representative of a second voltage at the second motor ($M_2$) of the associated hydraulic system;

the fitness detection logic is executable by the processor to determine the functionality of the associated hydraulic system by:

(i) determining, while the first motor ($M_1$) is activated and the second motor ($M_2$) is deactivated during the first test interval, whether the second voltage at the second motor ($M_2$) meets a predefined threshold voltage condition prior to expiration of the first test interval;

(ii) determining, while the second motor ($M_2$) is activated and the first motor ($M_1$) is deactivated during the second test interval, whether the first voltage at the first motor ($M_1$) meets the predefined threshold voltage condition prior to expiration of the second test interval; and (iii) generating the readiness signal representative of the determined functionality of the associated hydraulic system based on whether the first and second voltages meet the predefined threshold voltage condition during the first and second test intervals.

* * * * *